(12) United States Patent
Wang

(10) Patent No.: US 7,125,132 B2
(45) Date of Patent: Oct. 24, 2006

(54) GAUGE LIGHTING STRUCTURE

(76) Inventor: Ching-Hung Wang, No. 25, Lane 40, Sec. 3, Chung Yang N. Rd., Pei-Tou District, Taipei (TW)

( * ) Notice: Subject to any disclaimer, the term of this patent is extended or adjusted under 35 U.S.C. 154(b) by 215 days.

(21) Appl. No.: 10/949,368

(22) Filed: Sep. 27, 2004

(65) Prior Publication Data

US 2006/0066250 A1    Mar. 30, 2006

(51) Int. Cl.
*G01D 11/28* (2006.01)
(52) U.S. Cl. .............. 362/23; 362/26; 362/28; 362/31; 116/286; 116/284
(58) Field of Classification Search ............. None
See application file for complete search history.

(56) References Cited

U.S. PATENT DOCUMENTS 5,644,289 A * 7/1997 Frehner et al. ............ 340/461

6,820,990 B1 * 11/2004 Ewers et al. ................ 362/27

* cited by examiner

*Primary Examiner*—Tuyet Thi Vo
(74) *Attorney, Agent, or Firm*—Birch, Stewart, Kolasch & Birch, LLP

(57) ABSTRACT

This invention relates to a novel gauge lighting structure, mainly comprising the gauge panel, the lighting guide element and the lighting supply element. The gauge panel is very broadly used on the instrument cluster of the transportation vehicles. The gauge panel is an empty round housing with a glass pane mounted on the top for seeing through the signs or the record on the panel. The lighting guide element is a curve tube made of lighting sensitive material. The lighting supply element supplies the lighting from one end or two ends of the lighting guide tube. The lighting guide tube will absorb and transmit the lighting coming from the lighting supply and illuminate the inside of the gauge panel. The luminance of the lighting supply element is well controlled to regulate the sensitive lighting in the light guide tube to obtain clear signal signs and decorative blinking.

3 Claims, 4 Drawing Sheets

GAUGE LIGHTING STRUCTURE

BACKGROUND OF THE INVENTION

1. Field of the Invention

This invention concerns the a gauge lighting structure, an improvement for used on the gauges mounted on the instrument panel of vehicles to display the clear sign in the gauge and to render the blinking decoration.

2. Description of the Related Art

On the traditional instrument cluster of the vehicle, the handle of the gauge is usually driven by the servo motor mounted at the back center or one side of the gauge, and the dials or figures; it shows the working conditions of the vehicle. Such as speedometer, RPM gauge, fuel level gauge, etc. These mechanical gauges require other lighting supply to display what the gauge shows in the darkness. It is not easy to assemble, not good for viewing in the darkness, the traditional instrument panel uses outside lighting supply, but not sufficiently to display various messages and figure contained.

For this reason, the inventor has worked hard for years to come up with a novel gauge lighting structure in an attempt to simplify the mechanical gauge in structure, fabrication and assembly and ensure a better performance.

SUMMARY OF THE INVENTION

The main object of this invention is to provide a novel gauge lighting structure in which the spectral transmission length of the sensitive material is employed to the maximum and the gauge will have the lighting supply to display the signs or figures it is intended to present. Meantime, the gauge configuration is therefore simplified.

To achieve the above object, the gauge lighting structure contains a gauge panel, a lighting guide element and a lighting supply element, in which the gauge panel is very broadly used on the instrument cluster of the transportation vehicles. The gauge panel is an empty round housing with a glass pane mounted on the top for seeing through the signs or the record on the panel. The lighting guide element is a curve tube made of lighting sensitive material (such as optic fiber cable) mounted along the inside rim of the gauge panel. The lighting supply element is an electronic lighting element (such as LED and bulb) supplies the lighting from one end or two ends of the lighting guide tube. The lighting guide tube will absorb and transmit the lighting coming from the lighting supply and illuminate the inside of the gauge panel. The luminance of the lighting supply element is well controlled by a control circuit to regulate the sensitive lighting in the light guide element to obtain clear signal signs and decorative blinking.

DETAILED DESCRIPTION OF THE INVENTION

Figure 1:
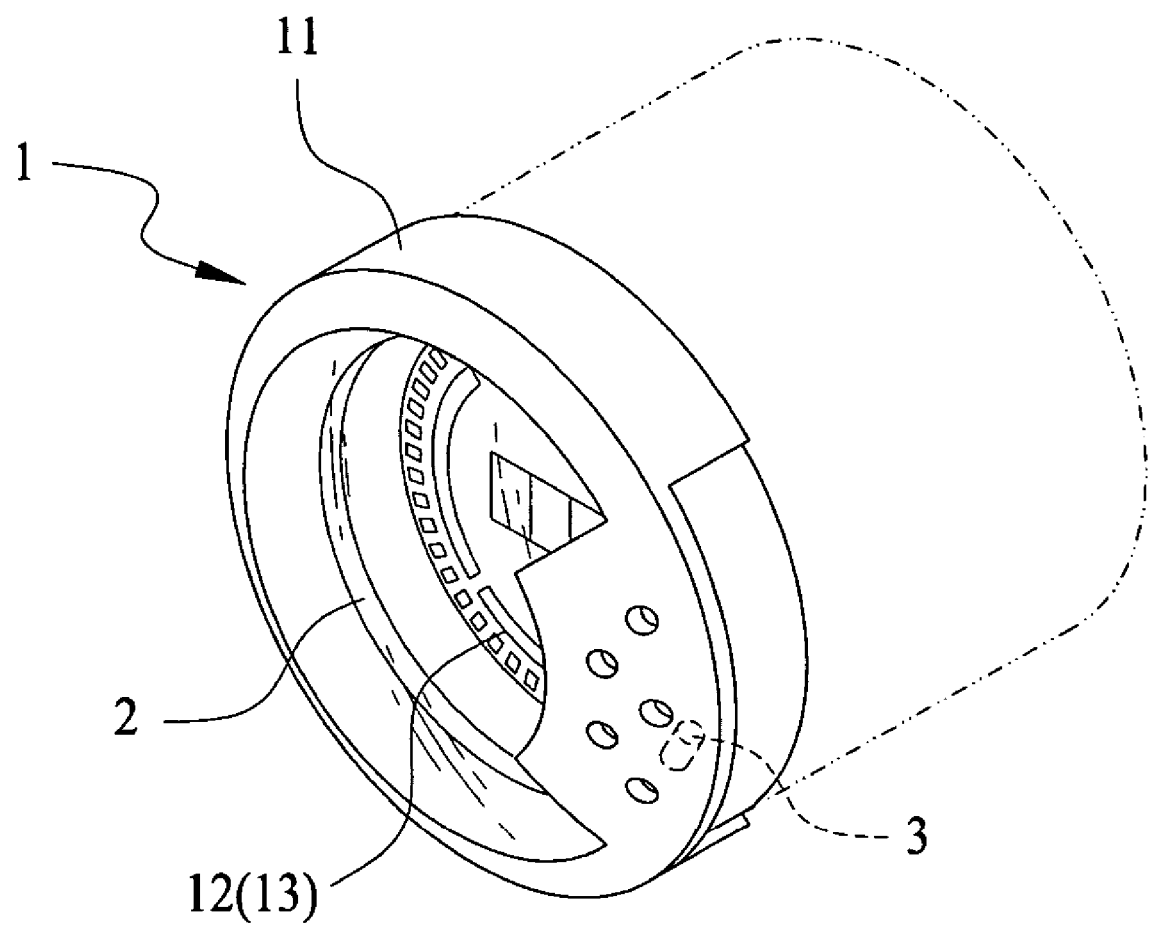
FIG. 1 shows the elevation of the gauge lighting structure of this invention.

The embodiments illustrated in the drawings will explain in great detail the features and purpose of the gauge lighting structure of this invention.

Figure 2:
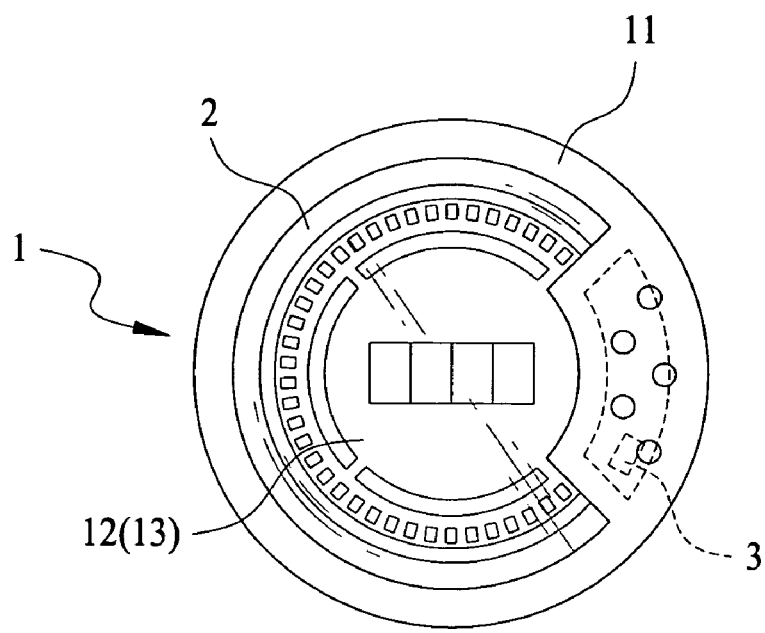
FIG. 2 shows the front view of the gauge lighting structure of this invention.

Pease refer to FIGS. 1 and 2; the gauge lighting structure of this invention comprises at least a gauge panel 1, a lighting guide element 2 and a lighting supply element 3 in which the gauge panel is broadly used on vehicles and other machinery to display the working conditions of the vehicles or machinery. The empty housing 11 (round, semi-round or fan form) has a glass pane 12 mounted on the top. At the bottom of the housing 11, there is dial panel 13. The lighting guide tube 2 is curve tube made of the light sensitive material (such as optic fiber cable), mounted along the inside rim of dial panel 13 under the glass pane 12. The lighting supply element 3 is an electronic element (such as LED or bulb) mounted at least at one end of the curve tube lighting guide element 2 which absorb and transmit the light coming form the lighting supply element 3. This is the major configuration of the gauge lighting structure of this invention.

Figure 3:
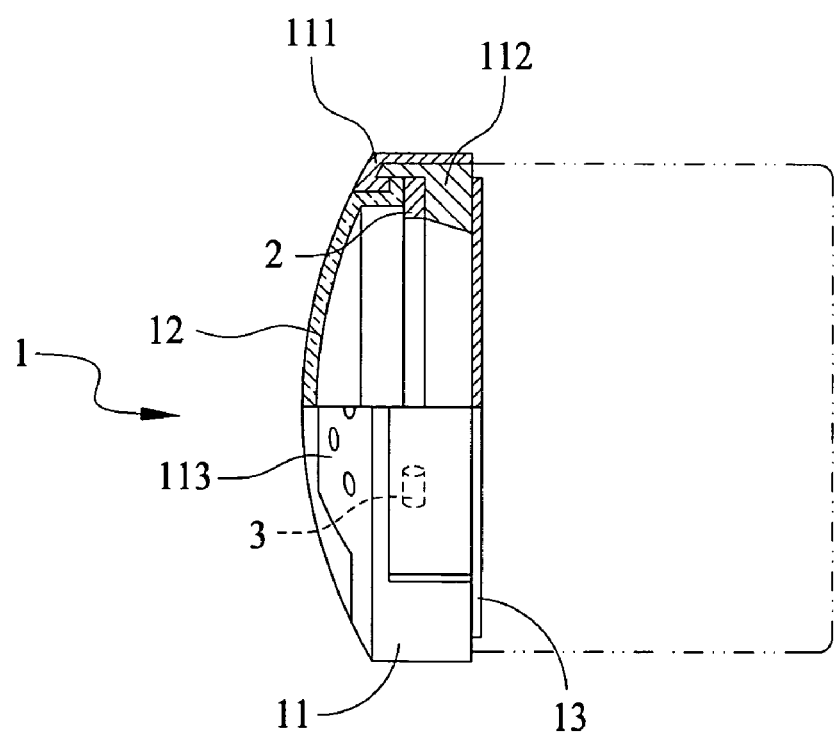
FIG. 3 shows the side view of the gauge lighting structure of this invention.
Figure 4:
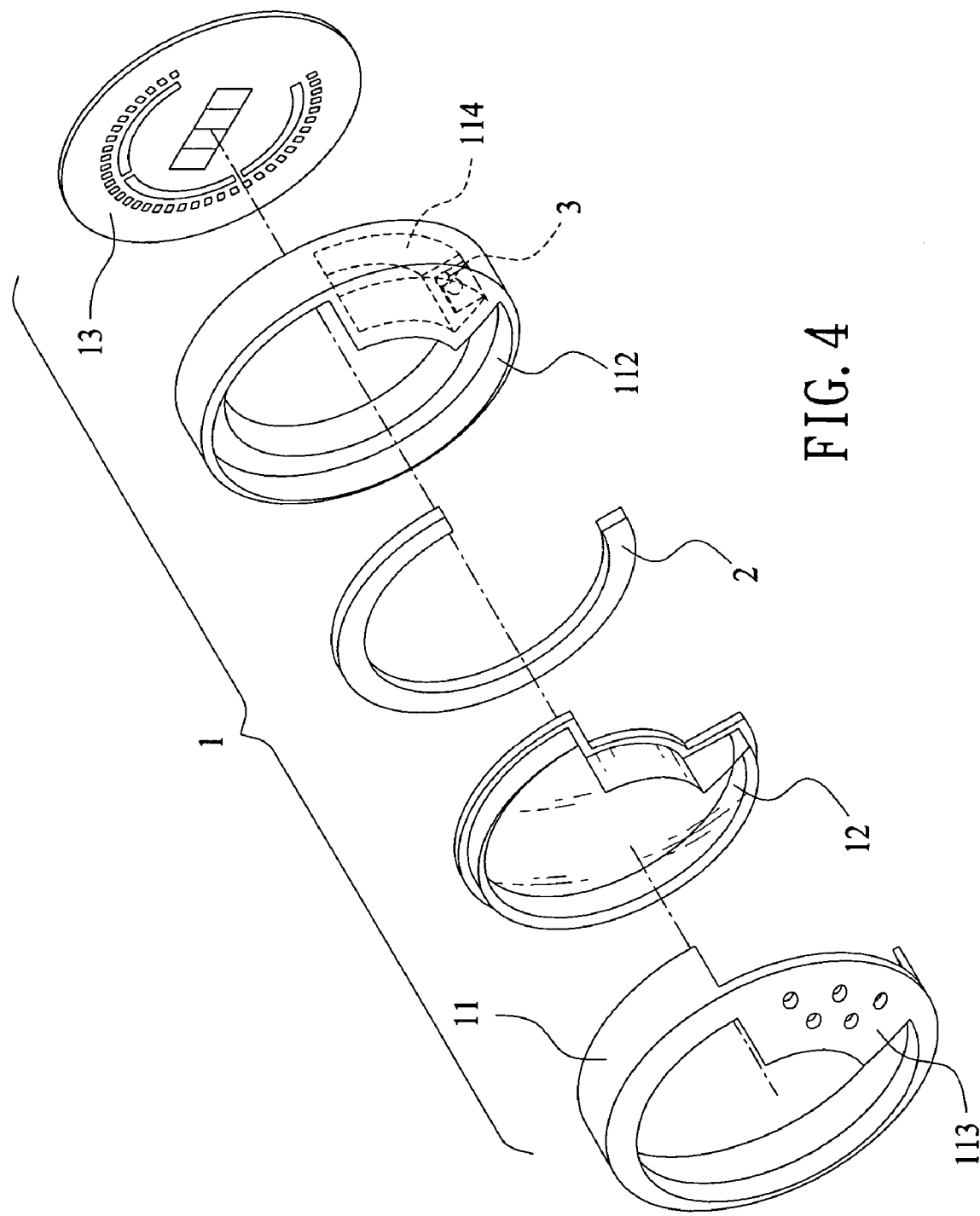
FIG. 4 shows the disassembly of the gauge lighting structure of this invention.

The gauge panel 1 also accommodates the lighting guide element 2 and the lighting supply element 3 inside. As shown in FIGS. 3 and 4, the housing 11 has an outer ring 111 and an inner ring 112 and between two rings. The outer ring 111 has a protruded light shield 113 and the inner ring 112 has a recess 114 to receive the light shield 113. The glass panel 12 goes between the inner ring 112 and the outer ring 111. The dial panel 13 is mounted at the bottom of the inner ring 112. The lighting guide element 2 is mounted beneath the glass pane 12. The lighting guide element 2 will extend into the recess 114 where the lighting supply element 3 is housed, and at least one end of the lighting guide element 2 will link to the lighting supply element 3.

This improved gauge lighting structure is in the position to receive all signals of vehicular working conditions via an electronic circuit. This electronic circuit also controls the luminance generated from the lighting supply element 3 and so to change the spectral lighting range in the lighting guide element 2, which makes the gauge panel 1 is always clearly viewed with the light guide element 2 such as the speedometer, RPM gauge and fuel level gauge. In the meantime, the combination of the lighting guide element 2 and the lighting supply element 3 can also fairly display sign and figures shown on the gauge. It is obvious that this lighting gauge structure is much easier to fabricate and assemble than the mechanical gauge.

Figure 5:
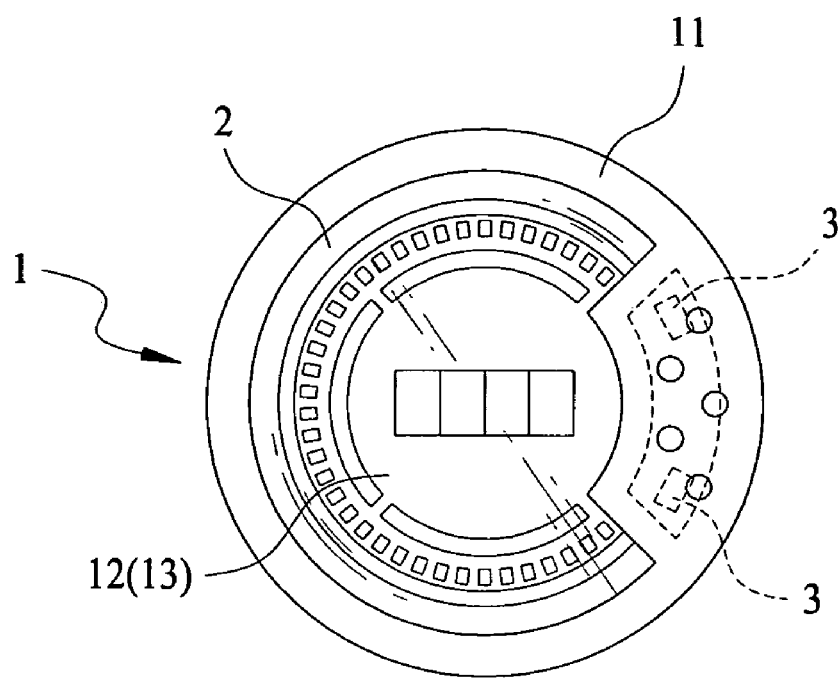
FIG. 5 shows another embodiment of the gauge lighting structure of this invention.
Figure 6:
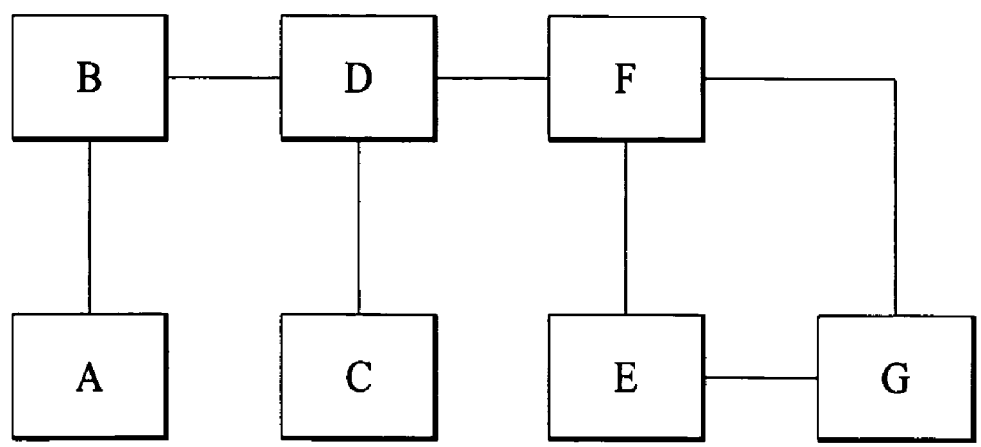
FIG. 6 shows the block diagram of audio controlled circuit for the gauge lighting structure of this invention.

As shown in FIG. 5, the lighting guide element 2 is outfitted with two lighting supplies element 3 at both ends. While linked with the audio controlled electronic circuit, the audio controlled circuit will respond to the rhythm of loud or weak music to create blinking light both in the lighting supply element 3 and the lighting guide element 2. The audio controlled electronic circuit is recommended as shown in FIG. 6, including an input circuit A, signal amplifier B, a voltage regulator circuit C, a filter circuit D, a control circuit E, a signal converter F. and an output circuit G. This audio controlled circuit will surely produce wonderful light blinking effect in the lighting guide element 2 and the lighting supply element 3.

Viewing from the above statement, it is learned that this gauge lighting structure has the practical application and a solid creation, well justified for a grant of a patent.

What the invention claimed is:

1. A novel gauge lighting structure at least comprises:
   a gauge panel to display the working condition of vehicle including an empty housing, a glass pane, a dial panel, a curve lighting guide tube made of light sensitive material mounted under the glass pane along the inner rim of gauge panel; and
   a lighting supply has at least one end linked to the lighting guide tube, wherein the lighting guide tube will guide the light beam coming from the lighting supply and transmit to the gauge for clear display.

2. The novel gauge lighting structure as claimed in the claim 1, in which the empty housing includes an outer ring and an inner ring, wherein the outer ring has an inward protruded light shield and the inner ring has an inward recess to receive the light shield, the dial panel is mounted beneath the inner ring and two ends of the lighting guide tube extend into the recess and link to the lighting supply.

3. The novel gauge lighting structure as claimed in the claim 1, in which an audio controlled electronic circuit is provided to produce the blinking effect in the lighting guide tube and the lighting supply.

* * * * *